Patented Aug. 31, 1937

2,091,640

UNITED STATES PATENT OFFICE 2,091,640

PROCESS OF DEWAXING MINERAL OIL

Leo D. Jones, Philadelphia, Pa., assignor to The Sharples Specialty Company, Philadelphia, Pa., a corporation of Delaware No Drawing. Application October 5, 1932, Serial No. 636,328

1 Claim. (Cl. 196—19)

This invention relates to a process for the production of dewaxed oil from wax-containing mineral oil and to the product thereof.

In the present state of the development of the dewaxing art, those oils which contain wax that precipitates in crystalline form upon cooling of the oil are usually dewaxed for the purpose of reducing the pour point of the oils by chilling a solution of the oil and removing the precipitated wax by filter-pressing. Herein, "pour point" refers to the A. S. T. M. pour test; and all viscosities mentioned herein are Saybolt universal viscosities expressed in seconds, and they are viscosities at 100° F. unless some other temperature is mentioned.

However, such mineral oils, and particularly lubricating-oil fractions of crude petroleum, generally contain in addition to wax that precipitates in distinctly crystalline form also wax that precipitates in amorphous or plastic form. At present it is contended that all wax precipitates in crystals, but herein the expression "crystalline" is intended to refer to wax which precipitates in hard crystals which are relatively large, and the expression "amorphous" is intended to refer to wax which precipitates in a soft or plastic form although it may be in the form of relatively small crystals. If the wax in the oil is all amorphous, or if the wax in the oil is largely amorphous and so extensively precipitated that the precipitated wax is as a whole substantially amorphous, the wax precipitated in the oil by chilling the oil or a solution thereof cannot be separated from the oil or a solution thereof by common filter-pressing because the amorphous wax rapidly clogs the filters; and such oils may be dewaxed by methods suitable to the removal of amorphous wax, such as methods dependent upon differences of specific gravity between the wax and the oil or a solution of the oil, such methods including centrifugal dewaxing. When precipitated amorphous wax is present in oil with precipitated crystalline wax, the amorphous wax tends to clog filters employed for the removal of precipitated wax from the oil, and the crystalline wax tends to clog a centrifugal rotor employed for that purpose and also tends to float upon or remain with the oil from which amorphous wax is separated. When oil contains both wax which precipitates in crystalline form and wax which precipitates in amorphous form, the lower is the temperature to which the oil is chilled preparatory to pressing the greater is the extent to which the amorphous wax therein is precipitated and the more amorphous as a whole is the precipitated wax. Accordingly, the possibility of commercially removing precipitated wax by filter-pressing is dependent upon the proportion of amorphous wax in the oil and upon the proportion thereof precipitated in the chilling of the oil, and the proportion of amorphous wax precipitated with the crystalline wax in oil containing both types of wax is dependent upon the extent to which the temperature of the oil is reduced in the chilling which precipitates the wax. The pour point of the dewaxed oil is dependent upon the extent to which wax is precipitated prior to the removal of precipitated wax and, therefore, upon the temperature to which the oil is chilled preparatory to wax removal. The temperature to which oil to be dewaxed by filter pressing may be chilled is limited to that temperature at which the wax precipitated is sufficiently crystalline for commercial filter pressing and accordingly the final pour point of oil so dewaxed is dependent upon the proportion of amorphous wax present in the oil. As oil is distilled off from petroleum in a batch distillation the first wax occurring in the distillate stream is markedly crystalline and the oil then in stream is oil of low viscosity (e. g. gas oil or spindle oil having a viscosity in the neighborhood of 40), and the wax in the stream becomes less and less crystalline and more and more amorphous as the distillation temperature rises and the oil in the stream becomes more and more viscous. Similarly, the higher is the boiling range of distillates produced by continuous distillation in a pipe-still and rectifying tower, the more amorphous is the wax precipitated in the distillate.

In accordance with prior practice, oils which contain crystalline wax in such proportion that they are dewaxed by filter-pressing, have been segregated from the petroleum in a fraction which contains also less viscous diluents such as gas oil, or they have been diluted with a solvent such as a naphtha, and then filter-pressed while chilled only to a temperature (e. g. 20° F. to 10° F.) which will precipitate the wax therein only to such extent that precipitated wax is so largely crystalline and so little amorphous that filter-pressing can be carried out without cloggage of the filter for a sufficiently long filtering period to make the operation commercially practicable. As a result, oils dewaxed by filter-pressing have possessed an undesirably high pour point (e. g. in the neighborhood of 20° F. to 40° F.). As one expedient for increasing the degree to which wax is removed from such oils and thereby improving the pour point thereof, successive chillings and pressings have been resorted to, but that expedient is only available in connection with oils of relatively low viscosity, because of the filter-clogging effect of amorphous wax in more viscous portions of oils dewaxed by filter-pressing. For example, a distillate of such nature that it may be filter-pressed at about 15° F., which may have a viscosity of approximately 85, may be divided by distillation in commercial practice after pressing into gas oil, and lubricating oils including spindle oils, turbine oils and light machine oils having viscosities varying from 80 to 180 and a residue will remain which may have a viscosity of 150 to 300, all of which fractions have pour points of 20° F. to 40° F.; or a distillate of suitable nature (e. g. wax distillate which has been subjected to some cracking may be filter-pressed while chilled and divided by distillation into a fraction to be re-pressed, and a residue having a viscosity in the neighborhood of 350, and the fraction to be re-pressed may with great difficulty be filtered at −14° F. to give a product having a cloud test of 0° F. from which gas oil and spindle oil may be distilled to give a distillate-residue having a viscosity in the neighborhood of 200 and a cloud test of about 4° F. But the oil of higher viscosity, such as the residue having a viscosity of 350 and obtained from the once-pressed oil, has an undesirably high pour point (e. g. 25° F.) which cannot be reduced by re-pressing because of the large proportion of amorphous wax therein, and the most viscous oil produced in reasonable quantity from the double-pressed oil has only a low viscosity.

Another expedient for overcoming the difficulty due to the presence of amorphous wax in oils which are dewaxed by filter-pressing, has been to subject the oil to limited cracking for the purpose of causing the wax precipitated therein by chilling to be more crystalline in form and therefore permit more extensive chilling with a view to obtaining a lower cold test; but such cracking degrades the oil and reduces the viscosity of all of the successively more viscous constituents, and results in losses of wax and losses of oil, the residue of the cracking operation being known as black oil and being used for less important types of lubrication such as lubrication of car journals.

The lower the temperature to which can be chilled an oil that is to be dewaxed by filter-pressing, without causing such precipitation of amorphous wax as will clog too rapidly, the lower will be the pour point of the filter-pressed product. But, chilling to such temperatures as might theoretically produce pressed oil of 0° F. pour point, causes such precipitation of amorphous wax in addition to crystalline wax that the duck filters employed clog so frequently that the attainment of 0° F. pour point is impracticable. While cracking increases the crystallinity of the precipitate in proportion to the degree of cracking and lowers the temperature to which the oil may be chilled without such precipitation of amorphous wax as will prevent removal of precipitated wax by filter-pressing, such cracking reduces viscosity and reduces especially the proportion of higher-viscosity constituents present in the oil. Such degree of cracking of a distillate, formed in reducing petroleum to a residue of 525° F. flash point, as will increase the crystallinity of the precipitate sufficiently to permit of filter-pressing at a temperature as high as 15° F., results in a destruction of substantially all of the oil constituents having a viscosity in excess of 300; and cracking of such intensity as will permit of chilling to temperatures low enough to produce a filter-pressed product having a pour point in the neighborhood of 0° F., precludes the possibility of obtaining in the pressed product constituents having a viscosity in the neighborhood of 300. Accordingly, it appears that the more extensive is the chilling the lower is the expected pour point of the pressed oil, but the lower is the chilling the more extensive must be the cracking, which is employed to increase the crystallinity of the precipitated wax, and the more extensive is the cracking the greater is the loss of constituents having a viscosity in the neighborhood of, or in excess of, 300.

As a result, straight run unblended oils containing those constituents of petroleum which are dewaxed by filter-pressing and which have a viscosity in excess of 200, and particularly in the neighborhood of and above 300, have not been commercially available with a low pour point in sufficient quantity to meet the demand for oils of such viscosity. This is because the amorphous wax present prevents filter-pressing at a temperature that would impart a low pour point, and oils having a viscosity in excess of 300 have been lost by cracking employed to assist the filter-pressing operation. Commercial oils dewaxed by filter-pressing and having viscosities only up to 280 or 300 and which are available in sufficient quantity to meet the demand for oils of such viscosity have pour points not lower than 15° F., whereas commercial oils dewaxed by methods suitable to the removal of amorphous wax are available with pour points in the neighborhood of 0° F., but those commercial oils have a viscosity as a whole which is not substantially lower than 150 at 210° F. and yield fractions having a viscosity not substantially lower than 60 at 210° F. Thus, there is not available commercially in sufficient quantity to meet the demand unblended low pour point oil produced from wax-containing oil and having a viscosity between 280 or 300 at 100° F. and 60 at 210° F., and the pour point of the oils having a viscosity below 280 or 300 is not satisfactorily low. Oils for special uses and having intermediate viscosities (between 300 at 100° F. and 60 at 210° F.) have been produced by blending filter-pressed oils of unsatisfactory pour point with centrifugally dewaxed oils of satisfactory pour point, but the pour point of the blended oil is unsatisfactory and the blended oil lacks constituents of intermediate viscosity whereas petroleum from which the oil is obtained comprises constituents of successively higher viscosities.

It is an object of this invention to dewax to such extent that the pour point thereof is in the neighborhood of 0° F. those oils heretofore lost by cracking distillation employed preparatory to filter-pressing and those oils heretofore dewaxed only to such extent that the pour point thereof is in the neighborhood of 20° F. because the wax therein is too amorphous to permit of pressing at such lower chilling temperatures as are necessary to bring the pour point of such oils to a temperature in the neighborhood of 0° F.

In the practice of this invention a body of oil containing crystalline wax, especially when the crystalline wax is present in such proportion as to permit of partial wax removal by filter-pressing, or in such proportion as to impair or prevent continuous centrifugal dewaxing thereof, is partially dewaxed by filter-pressing and then divided by non-cracking distillation into a fraction which contains lower boiling constituents and which may also contain residual crystalline wax, and a fraction containing higher boiling constituents and also wax which as a whole is more amorphous than the wax in the original body of oil, and the latter fraction is dewaxed by methods suitable to the removal of amorphous wax and particularly continuous centrifugal dewaxing. It is a feature of this invention that the body of oil so dewaxed may be produced either by cracking distillation or preferably by non-cracking distillation and the distillation may be batch or semi-continuous in shell stills, or continuous in a pipe-still associated with a rectifying tower. A feature of this invention is that the oil to be subjected to filter-pressing may be subjected to such purifying and diluting prior to filtering as may be required in the light of present practice and the experience of operators skilled in dewaxing by filter-pressing. In the practice of this invention the chilling preparatory to filter-pressing is carried to that temperature, dependent upon the proportion of amorphous wax in the oil, which will effect precipitation of a substantial proportion of the contained crystalline wax and avoid a precipitation of such proportion of amorphous wax as will so rapidly clog the filters that the filtering operation is rendered non-commercial. For example, distillates containing those constituents of petroleum which are distilled over in non-cracking batch distillation while the stream viscosity is relatively low (e. g., not higher than 600) and distillates produced by cracking or subsequently subjected to cracking, may be chilled to temperatures in the neighborhood of 15° F. preparatory to pressing, whereas distillates containing those constituents of petroleum which would be distilled over in non-cracking batch distillation during a rise of the stream viscosity from about 40 to as high as 1200, may be chilled to only about 40° F. preparatory to pressing.

A further feature of this invention is that the dewaxing of the residue of the filter-pressed oil by methods suitable to the removal of amorphous wax may be facilitated by additional steps or precautions to the end that such residue may be dewaxed by continuous centrifugal dewaxing in spite of the presence therein of crystalline wax which would otherwise tend to float in the oil and pass therewith from the centrifuge or tend to clog the centrifuge. Thus, there may be caused to be present in such residue, amorphizing agents which tend to cause wax precipitated therein to possess such specific gravity that it may be separated from the oil by difference of specific gravity and such plasticity that it may be separated from the oil by continuous centrifugal separation. Examples of such amorphizing agents are amorphous wax or petrolatum, and substances other than hard asphalt and of the nature of those removed from petroleum oils by acid treatment or by clay treatment or by both of such treatments. Said last named substances are usually present in effective proportion when the oil is dark red by transmitted light in the neck of a four-ounce oil sample bottle, e. g., when a dilution consisting of 10% oil and 90% colorless solvent has a Lovibond color between approximately 40 and 100 (500 series) in a ¼ inch cell. Such amorphizing agents can be added to such residue separately or there can be added to such residue oil containing such agent or agents as the operator desires to utilize. It is to be noted that the above-mentioned substances can be caused to be present in oil prepared from residues or distillates containing them, by careful limitation of acid and clay treatment or by so distilling the oil as to carry over the substances in desired quantity. The use of such amorphizing agents is more fully described in my application, Serial No. 147,383, filed November 9, 1926, and my Patent No. 1,784,525. Also for the purpose of causing the wax precipitated in such residue to possess amorphousness, very intense chilling (e. g., to temperatures as low as −80° F.) may be employed in order to increase the proportion of amorphous wax precipitated as set forth in my application, Serial No. 285,840, filed June 18, 1928. Moreover, difficulty imposed upon filtration by the presence of amorphous wax may be minimized by procedure in accordance with my Patent No. 1,806,570, wherein a filter comprising felted resilient fibers is proposed for the purpose of minimizing filter-clogging due to the presence of amorphous wax.

A specific feature of this invention is that that part of the filter-pressed oil which is removed in forming the residue of filtered oil which is subsequently dewaxed by methods suitable to the removal of amorphous wax, is further chilled and re-pressed. The oil to be so re-pressed, being wholly or substantially free of amorphous wax which is left in such residue, may be chilled to such temperatures as will give re-pressed oil having a pour point in the neighborhood of 0° F. The re-pressed oil will yield by distillation gas oil and spindle oil and a distillate-residue having a zero pour point and a maximum viscosity of about 150.

A further feature of this invention is that the residue of the filter-pressed oil, which residue is dewaxed by methods suitable to the removal of amorphous wax, may be mixed with a petroleum residue for the purpose of causing the amorphous wax of the residue to exert an amorphizing effect upon the wax precipitated by chilling in the mixture; and the petroleum residue may constitute such part of the wax-containing petroleum that the resulting dewaxed oil contains substantially the same constituents, identified by their boiling points, in substantially the same relative proportions, as does wax-containing petroleum. Thus, the dewaxed oil will have a viscosity between 300 at 100° F. and 85 at 210° F., but will not be lacking in constituents of intermediate viscosity as in the case of oils of similar viscosity produced by blending low-viscosity filter-dewaxed oils with high-viscosity oils. The mixture after dewaxing will have a pour point as low as 0° F. and will not be lacking in constituents of intermediate viscosity which have heretofore been lost by cracking or have not been dewaxed sufficiently to possess such a pour point; and those constituents of intermediate viscosity and low pour point can be isolated by distillation for use.

A further feature of this invention is that for the first time all lubricating constituents of petroleum oil can be dewaxed to such an extent that the pour point thereof is in the neighborhood of 0° F., the lighter portion of a filtered distillate being brought to such cold test by re-pressing, the oil contained in the residue of the pressed distillate being brought to such pour point by pressing and centrifuging, and the petroleum constituents of high viscosity being brought to such pour point by centrifuging.

In good refinery practice oils filter-pressed for wax removal are subjected to purifying treatment after pressing, and oils dewaxed by methods suitable to the removal of amorphous wax are subjected to purifying treatment before such dewaxing; and features of this invention are that the advantages of such good practice are attained and preserved in the practice of this invention, and that to that end the residue of a pressed oil, which residue is to be dewaxed by methods suitable to the removal of amorphous wax, and a petroleum residue mixed therewith for the purpose of facilitating the dewaxing of the residue of the pressed oil, are purified together and only a single body of oil is handled in the purifying step, but, nevertheless, each body of oil is subjected to purification at the best point in its treatment. Thus, notable economy and uniformity of effect and simplicity of operation are attained without loss of the advantages of best practice.

In the practice of this invention, the oil to be dewaxed by methods suitable to the removal of amorphous wax is handled in such manner, as has long been common practice, as to avoid decreasing the amorphousness of amorphous wax present. To that end cracking is scrupulously avoided in distillation by use of steam and reduced pressure, and in clay treatment, which is preferably effected by the so-called "contact method". In this connection it may be noted that temperatures occurring in acid treatment have no influence upon the amorphousness of the wax.

While this invention is applicable to the dewaxing of all oils containing wax which is crystalline in such proportion as to permit of removal of some part of the wax by filter-pressing, of which further non-exclusive examples are hereinafter set forth, this invention will be described in connection with dewaxing of "wax distillate" in order more fully to disclose the same with the understanding that this invention is not limited to the dewaxing of such oil.

With such understanding, an example of the practice of this invention comprises the formation, by non-cracking distillation of any kind, of a distillate known as "wax distillate" and containing those constituents of Appalachian or Mid-Continent petroleum which distill over in batch distillation between the first occurrence of wax in the distillate stream and the reduction of the residue to a cylinder stock residue having a flash point between 450° F. and 525° F. or higher. Such a distillate will have an A. P. I. gravity of about 29° if obtained from Mid-Continent petroleum, of about 34° if obtained from Pennsylvania petroleum, a flash point of 175° F. to 250° F., a viscosity of 60 to 80 and a pour point of 60° F. to 70° F. Such wax distillate contains both crystalline wax and amorphous wax and some wax can be removed therefrom by filter-pressing. However, there is so much amorphous wax present that this distillate which contains sufficient gas oil to dilute it properly for filter-pressing cannot be filter-pressed unless chilled only to a temperature between 30° F. and 50° F.; further chilling would effect such precipitation of amorphous wax as would cause too rapid clogging of the filter. Filter-pressing will produce paraffin wax and a filter-pressed oil having a cold test of 10 to 15° higher than the chilling temperature employed. The pressed distillate may be subjected to distillation and the stream may be cut when the viscosity thereof is between 130 and 200 seconds. The lighter fraction may be chilled to such temperature between 15° F. and —5° F., depending upon the stream viscosity at which the distillation was cut, as will cause precipitation of wax sufficiently crystalline and sufficiently free of amorphousness for filter-pressing. Upon filter-pressing of the rechilled lighter fraction there is produced wax and an oil which when freed by distillation of gas oil constitutes dewaxed neutral oil having a pour point between 20° F. and 0° F. depending upon the chilling temperature employed.

In accordance with this invention, the residue of the once-pressed wax distillate is dewaxed by methods suitable to the removal of amorphous wax, employing, if necessary, the step of adding an amorphizing agent to the end that wax precipitated by further chilling of said residue will be sufficiently amorphous for continuous centrifugal removal. As one example of the practice of this invention, the residue of the pressed wax distillate may be mixed with a steam-refined cylinder stock having a flash point of 450° F. to 600° F. or 700° F. which is the residue of the petroleum from which the wax distillate was obtained, or is a residue obtained from another body of petroleum. For example, the wax distillate may have been obtained from a Mid-Continent petroleum and it may be mixed with steam-refined cylinder stock obtained either from Pennsylvania petroleum or from a Mid-Continent petroleum having a sufficiently low asphalt content to permit of economical removal of the asphalt by acid treatment and/or clay treatment. Preferably, the mixture of the residue of the pressed distillate and the petroleum residue will be subjected to purification by acid and/or clay treatment, taking care that temperatures employed in the contacting do not reduce the amorphousness of the wax in the mixture. The purification may be of such thoroughness that the mixture is brought substantially to final color or it may be milder to the end that the mixture will contain substances other than hard asphalt and of the nature of those substances commonly removed from petroleum by acid and/or clay treatment, leaving the mixture with a dark red color by transmitted light to the end that centrifugal dewaxing thereof will be assisted as above described.

The mixture, brought to desired color, is then dewaxed by methods suitable to the removal of amorphous wax, for example, by centrifugal dewaxing. In carrying out such dewaxing, the oil may be diluted with such proportion of naphtha of such specific gravity that wax precipitated therein by chilling will all be heavier than the residual solution and there will be room enough in the mixture for the particles of precipitated wax to form separately instead of as a jelly-like mass. For example, the mixture may be diluted with 62° A. P. I. naphtha to such extent that the naphtha constitutes in the neighborhood of 75% of the resulting mixture. The mixture is then heated to a temperature at which all wax therein will be in solution, and it may be chilled to a temperature depending upon the desired pour test of the dewaxed oil, it being known that the final pour point of centrifugally dewaxed oil is dependent upon the chilling temperature employed. Thus, the mixture may be chilled to a temperature between —20° F. and —80° F., the chilling being carried out in accordance with the principles of my Patent No. 1,558,619 to the end that shock chilling will be avoided and the rate of chilling during critical stages will be in the neighborhood of 2½° F. to 3° F. per hour. Thereafter the chilled oil may be freed of wax centrifugally in accordance with well-known practice as set out in Sharples Patent Nos. 1,232,104, 1,351,265, 1,416,890, and 1,416,891. After being freed of diluent the dewaxed oil will possess a pour point equal to or in the neighborhood of 0° F., a viscosity of 50 at 210° F., a flash point of 400° F. and it will comprise substantially all lubricating constituents present in petroleum oil and having a viscosity in excess of 130 to 200, in substantially the proportions in which those constituents exist therein and there will be no gap or absence of constituents as in the case of lubricating oil produced with a desired viscosity by blending dewaxed cracked wax distillate and dewaxed residual oil. From dewaxed oil so obtained there may be obtained by distillation and purifying treatments commonly employed in refineries, commercial lubricating oils possessing almost all boiling ranges except spindle oils and non-viscous neutral oils and possessing substantially any desired viscosity and each cut will be made up of constituents having viscosities approximating the desired viscosity. From the dewaxed product there is readily obtained lubricating oil having a zero pour point and viscosities between 300 at 100° F. and 200 at 210° F., such oils being made up of constituents having successively higher viscosities.

While an important feature of my invention is the dewaxing of a residue of a filter-pressed oil by mixing the same with a petroleum residue in which the wax is substantially all amorphous or sufficiently amorphous for continuous centrifugal separation, it is obvious in the light of the foregoing that crystallinity of the wax in the residue of the pressed distillate which might interfere with the dewaxing thereof, by methods suitable to the removal of amorphous wax, can be overcome by the use of amorphizing agents other than amorphous-wax-containing residue. For example, for that purpose there may be added to the residue of the filter-pressed oil, petrolatum alone or petrolatum containing substances other than hard asphalt which are of the nature of substances removed from petroleum by acid and/or clay treatment, oil containing amorphous wax, oil containing the amorphizing substances last mentioned or containing amorphous wax and said substances, or said substances obtained from any source, such as substances found in nature or extracted from clay which has been used to remove such substances from petroleum.

In connection with the foregoing, it is pointed out that this invention is not limited to the addition of amorphizing agents to the residue of the filter-pressed oil prior to the dewaxing of such pressed residues but comprehends the dewaxing of such residues without such additions. Such procedure applies to residues of various filter-pressed oils, especially when intense chilling is employed to impart amorphousness to precipitated wax; and examples of oil readily so treated are residues of a pressed residue of low flash point (300° F.) and a short residue of a pressed distillate that was obtained by carrying the distillation of petroleum to a point at which the flash point of the petroleum residue is higher than the flash point of the residue remaining after the formation of the wax distillate above described.

As an alternative, the wax distillate may, prior to the filter-pressing thereof, be subjected to distillation, with little or no bottom steam, in which cracking occurs to an extent so limited that the wax precipitated by chilling of the cracked wax distillate is more crystalline than the wax precipitated in the uncracked wax distillate, and the loss of viscous constituents as a result of the cracking is not excessive. In such case, the cracked wax distillate may be chilled to temperatures in the neighborhood of 15° F. without such precipitation of amorphous wax as will too rapidly clog the filter. Thereupon the pressed distillate is subjected to non-cracking distillation to remove lower-boiling constituents and such wax as distills off therewith, and the distillation is cut when the stream viscosity lies between 130 and 200. The distillate so formed will yield spindle oils and neutral oils having pour point in the neighborhood of 25° F., or the distillate of the pressed distillate may be chilled to a lower temperature and re-pressed to produce similar final products having a pour test in the neighborhood of 0° F. and a maximum viscosity in the neighborhood of 150. In this embodiment of my invention the residue of the cracked and pressed wax distillate is dewaxed by a method suitable to the removal of amorphous wax, in accordance with the principles of the procedure described above in connection with the dewaxing of the residue of the uncracked pressed wax distillate.

While this invention is applicable to the dewaxing of various oils which have heretofore been subjected only to filter-pressing for the removal of wax, with consequent high pour point of resulting oil, as above set out, there are numerous additional examples of oils to which this invention is not limited but which occur frequently and in large volume in ordinary refinery practice and which are dewaxable in accordance with this invention, namely, by filter-pressing of the oil to partly dewax the same at a temperature not sufficiently low to precipitate enough amorphous wax to prevent such pressing, dividing the pressed oil of undesirable pour point (20° F. to 70° F. or higher) into (a) a fraction which has such pour point but may be further dewaxed by pressing to produce lubricating oils of 0° F. pour point and viscosities up to 150, and (b) a residue of the pressed oil which may be dewaxed by methods suitable to the removal of amorphous wax to produce oil of 0° F. pour point which may be divided into fractions of such pour point having viscosities above 200. One of such oils which may be termed "pressable distillate" is a distillate produced by any type of non-cracking distillation from Appalachian or Mid-Continent petroleum and comprising those constituents which would be distilled over in batch distillation between the first occurrence of wax in the distillate stream and the reduction of the residue to a residue having a flash point in the neighborhood of 400° F. Such distillates are capable of being partly dewaxed by filter-pressing at temperatures not substantially below 15° F., and the residue of the pressed distillate may be dewaxed as herein described while the lighter constituents distilled from the pressed distillate possess a pour point in the neighborhood of 25° F. and may be used in that form or further dewaxed as herein described. Another of such oils may be termed "paraffin distillate" and it includes those constituents which are obtained in reducing Mid-Continent petroleum to coke by distillation involving cracking and in which little or no steam is employed. Such paraffin distillates contain substantially all lubricating constituents obtainable from such petroleum by such distillation. Such paraffin distillates can be partly dewaxed by filter-pressing at temperatures not substantially below 15° F., and the residue of the pressed distillate may be dewaxed as herein described while the lighter constituents distilled from the pressed distillate possess a pour point in the neighborhood of 25° F. and may be used in that form or further dewaxed as herein described. Another of such bodies of oil may be termed "cracked wax tailings" or "cracked slop distillate", and in the production thereof there is first obtained by a non-cracking distillation from Appalachian or Mid-Continent petroleum a "wax tailing" or "slop" distillate fraction including those constituents which would be distilled over in batch distillation while increasing the flash point of the residue approximately through the range from 400° F. to 500° F. or 525° F., and then the product of the non-cracking distillation is re-distilled by controlled cracking distillation, producing a distillate which is pressable at temperatures not substantially below 15° F., and the residue of the pressed distillate may be dewaxed as herein described while the lighter constituents distilled from the pressed distillate possess a pour point in the neighborhood of 25° F. and may be used in that form or further dewaxed as herein described. Moreover, the "wax tailings" or "slop" distillate produced by non-cracking distillation may, in accordance with this invention, be partly dewaxed by filter-pressing at a temperature in the neighborhood of 60° F. at which so much amorphous wax as will prevent pressing is not precipitated, and the residue of the pressed distillate may be dewaxed as herein described while the lighter constituents distilled from the pressed distillate possess a pour point in the neighborhood of 70° F. and may be used in that form or further dewaxed as herein described.

Obviously, there are other bodies of oil to which this invention applies and which may be produced from wax-containing petroleum, some of such bodies of oil being mentioned in addition to the above examples with the understanding that the scope of this invention is not thereby limited. Thus, there may be produced from Mid-Continent petroleum by non-cracking distillation a distillate containing substantially all of the lubricating constituents of the oil and formed by reducing the residue to flux or coke. Again, certain petroleum oils may yield a residue of low flash point containing crystalline wax in such proportion that an appreciable quantity of wax may be removed by filter-pressing provided the filtering temperature is not so low as to precipitate enough amorphous wax to clog the filter. The distillate and residue last mentioned are capable of being partly dewaxed by filter-pressing at a temperature between 15° F. and 70° F. at which so much amorphous wax is not precipitated as will prevent filter-pressing, and the residue of the pressed oil may be dewaxed as herein described while the lighter constituents distilled from the pressed oil possess a pour point ten to fifteen degrees Fahrenheit above the pressing temperature and may be used in that form or further dewaxed as herein described.

When the step of adding oil containing amorphous wax is employed to facilitate dewaxing of the residue of a pressed oil there may be employed in lieu of the cylinder stock mentioned in the above example, a residue which is longer and has a flash point between 450° F. and 500° F. to 525° F. Also, there may be employed a mixture of a residue of a wax-containing petroleum, with a heavy distillate produced with a minimum of cracking, as by means of a pipe-still and fractionating tower operating under sub-atmospheric pressure from Mid-Continent petroleum, leaving a residue of asphalt as free as possible from lubricating oil constituents. The distillate and the residue so mixed preferably have substantially the same flash point and the distillate is an amorphous-wax-containing distillate and the resulting mixture preferably comprises two to four parts by volume of distillate to each part of petroleum residue. Herein a reference to a fraction of petroleum is intended as a reference to either a distillate or a residue or a mixture of a distillate and a residue.

I claim:

In the manufacture of lubricating oils, the improvement which comprises subjecting a lubricating oil stock containing crystalline and amorphous wax to distillation to separate a fraction containing a major portion of crystalline wax and a fraction containing amorphous wax, chilling and pressing the first-mentioned fraction to separate crystalline wax, distilling from the pressed oil lower boiling constituents, together with any crystalline wax which distills therewith, blending the resulting residue of pressed oil with the second-mentioned fraction, and chilling and centrifuging the blended fractions to separate amorphous wax.

LEO D. JONES.